Figure 1:
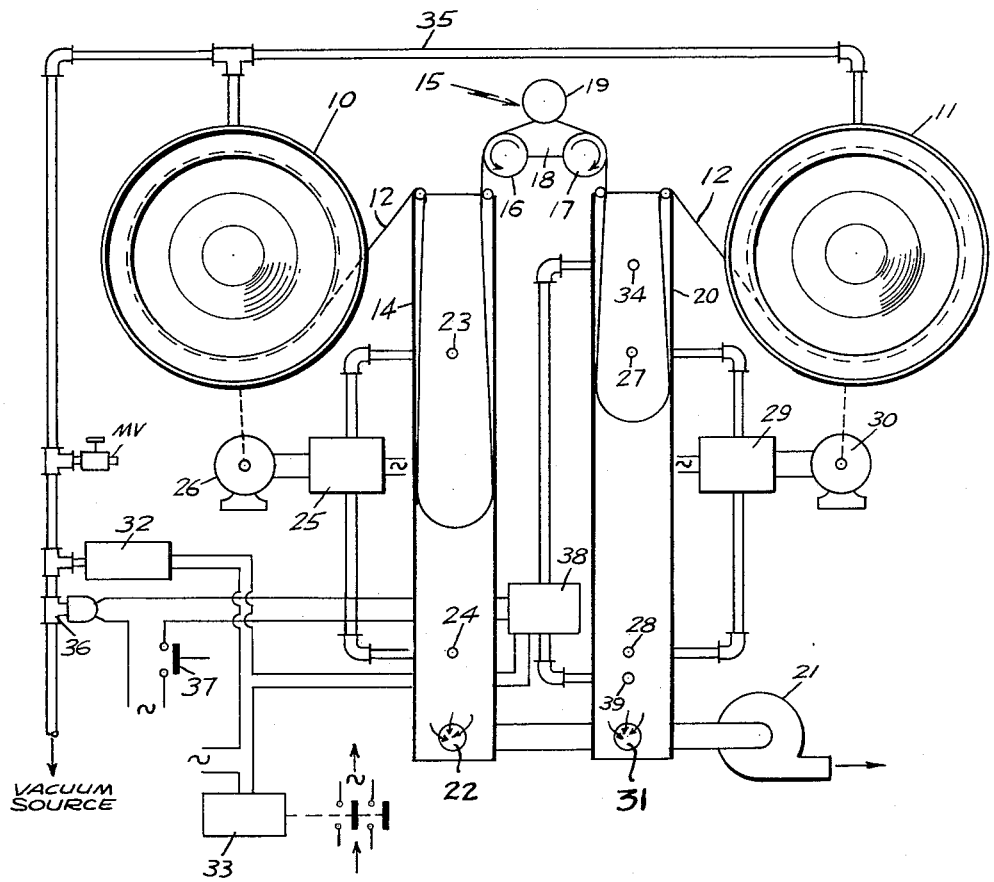

Aug. 29, 1961

R. A. PENDLETON 2,998,206

MECHANICAL APPARATUS FOR SUPPORTING AND
DRIVING A REEL ASSEMBLY

Filed Jan. 13, 1958

3 Sheets-Sheet 1

INVENTOR.
R. A. PENDLETON
BY
ATTORNEY

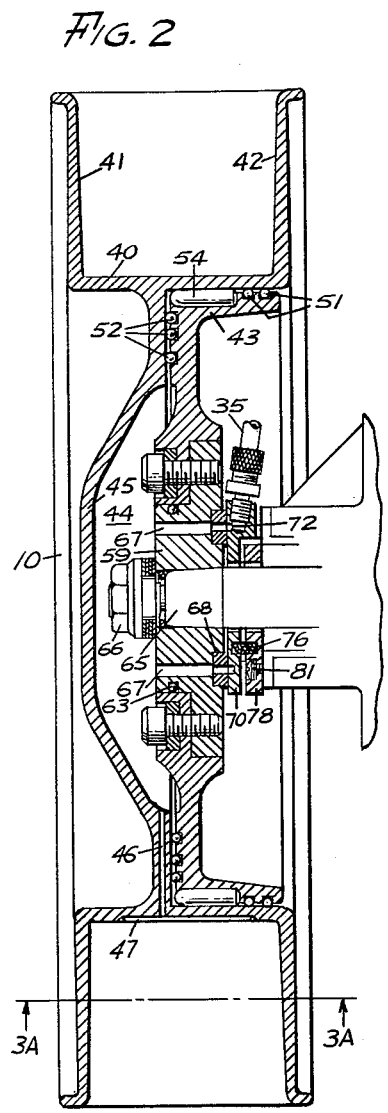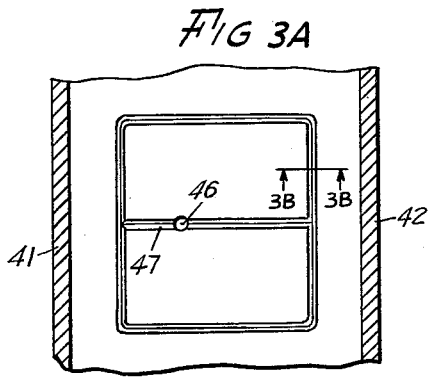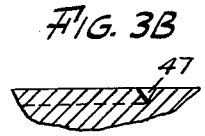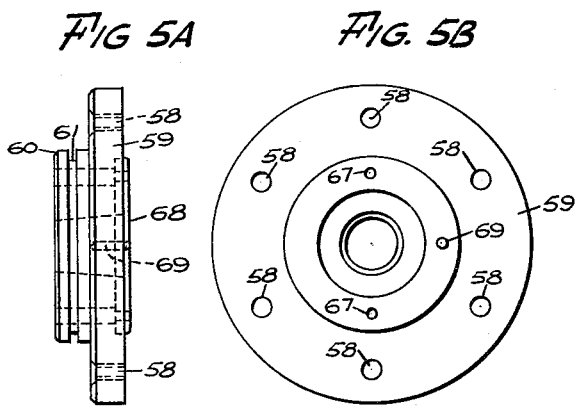

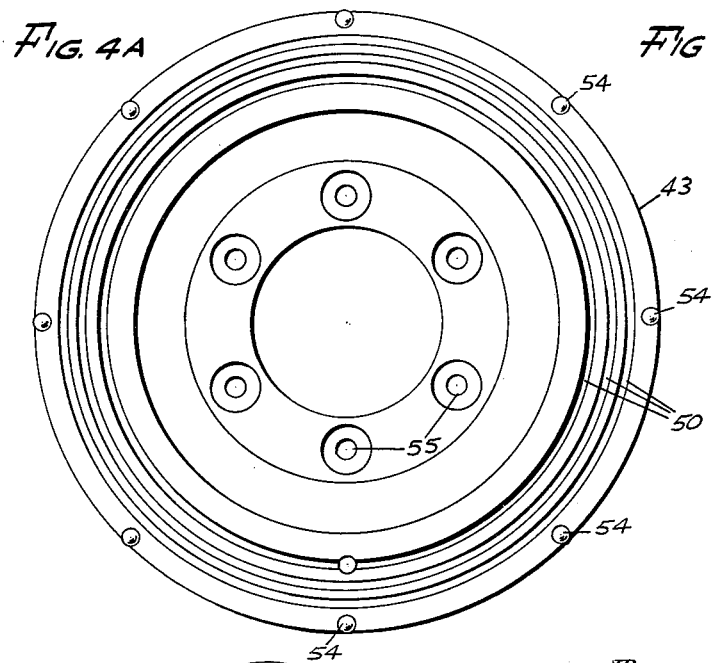
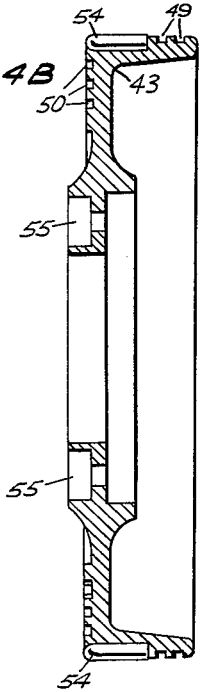
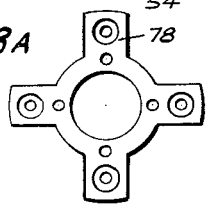
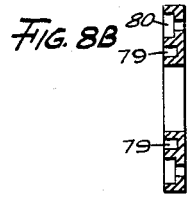
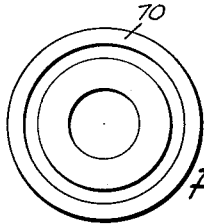
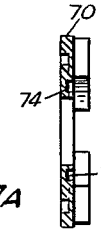
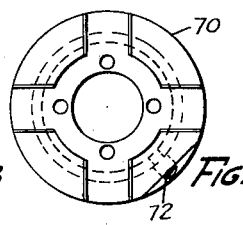
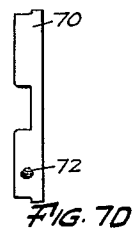
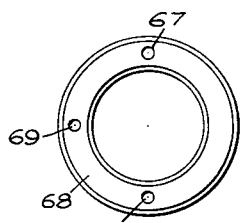
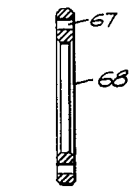
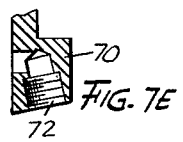

United States Patent Office 2,998,206
Patented Aug. 29, 1961

2,998,206
MECHANICAL APPARATUS FOR SUPPORTING AND DRIVING A REEL ASSEMBLY
Robert A. Pendleton, Dedham, Mass., assignor to Minneapolis-Honeywell Regulator Company, Minneapolis, Minn., a corporation of Delaware
Filed Jan. 13, 1958, Ser. No. 708,491
9 Claims. (Cl. 242—68.1)

A general object of the present invention is to provide a new and improved apparatus for coupling a member to be rotated to a rotating shaft. More specifically, the present invention is concerned with a new and improved apparatus for coupling a reel to a rotatable shaft wherein the apparatus is characterized by its simplicity, the ease with which it may be placed in operation and out of operation, and its adaptability to provide other advantageous auxiliary functions.

In many types of mechanisms, it is necessary that two movable parts be physically coupled together and that the coupling be readily releasable. A type of mechanism requiring such a coupling is one having a rotating shaft which is to drive a reel which may have some material stored thereon. A representative apparatus using a drive shaft and reel may be, for example, a magnetic tape handling mechanism for a magnetic recording and playback apparatus. In such apparatus, it is frequently desired that a magnetic tape be stored on a reel from which the tape may be passed to a recording head and then to a take-up reel. The reels are frequently changed or replaced in such a mechanism in order to change the magnetic tape that is being used.

The placing of a reel into an operative position in the mechanism, and the removal thereof from the mechanism, must be accomplished with a minimum of physical effort and skill on the part of an operator. Further, it is desirable that once the reel has been placed in an operative position in the mechanism that it be rigidly coupled to a drive shaft. The coupling of the reel to the drive shaft is complicated somewhat for the reason that the tape is not fed onto or taken off of the reel at a uniform reel speed but rather intermittently. In magnetic recording apparatus, the tape used must be passed at a uniform speed under the data transfer head associated with the magnetic tape. Since the effective reel diameter will be changing as the tape is taken off of a reel or built up on the reel, it will be apparent that the tape fed from the reel will not be moving at a constant speed. To isolate the effect of variations in tape speed at the reels, a pair of loop chambers, into which the magnetic tape is arranged to pass, may be used to provide slack in the tape on either side of the data transfer head. Thus a separate drive means for the tape may be provided between the loop chambers to insure uniform velocity of the tape under the data transfer head. Such an arrangement as this requires that the tape be fed from or taken up on the reels to maintain a desired amount of slack tape in the loop chambers. This may be done by starting and stopping an associated reel drive motor which is coupled to the reel.

The starting and stopping of the reel motor, particularly when a fully loaded reel is being driven thereby, creates considerable driving force on the reel and any associated coupling between the motor and the reel. Any slippage between the reel and the driving mechanism can not be tolerated as it will tend to throw the reel from the driving mechanism and may cause scoring of the mechanical coupling surfaces. Further, if the tape is not properly maintained in the loop chamber due to slippage of the driving coupling, the tape may be pulled out of the chamber or accumulate excessively in the bottom of the chamber to cause an emergency condition. While a firm coupling is required when the reel is in position to be driven, it is equally essential when an operator desires to remove the reel that it be readily decoupled from the driving mechanism.

It is accordingly a still further more specific object of the present invention to provide a new and improved reel and driving mechanism therefor where the reel is adapted to be driven in an interrupted manner with frequent starting and stopping.

The advantages of the present invention are achieved by the use of a fluid pressure to create a high coupling force between a reel and a drive hub therefore so that the reel is firmly held in position. One form of fluid pressure may be a pressure differential created by providing a subatmospheric pressure which may co-operate with the ambient atmospheric pressure to effect the desired coupling. The removal of this pressure differential which, when active, will firmly engage the reel to the hub, will serve to condition the apparatus so that an operator may readily remove the reel from its coupled position without the necessity of performing any manual operation other than the physical lifting of the reel from its drive hub.

A still further more specific object of the invention is then to provide a reel assembly which is adapted to be coupled to a driving mechanism by a fluid pressure which may be readily removed from an active state to permit an operator to physically remove the reel from the position where it is being driven.

Another feature of the invention lies in the manner in which the media on the reel may be locked in position without the need of any mechanical coupling. Thus, in the case of a magnetic tape, when the tape is being placed on the reel, it has heretofore been necessary that the end of the tape be fastened in position on the reel by some mechanical means, such as a clamp or by the use of a gummed tape. The use of a mechanical clamp requires that the operator take time to engage the clamp. The use of the gummed tape is frequently undesirable for the reason that it may become disengaged in the course of an operative problem and become lodged in other portions of the apparatus. As taught by the present invention, a fluid pressure, which may be available as the pressure for coupling the reel to its driving hub, may be utilized as a means for coupling the end of the tape to the spindle of the reel. Such an arrangement as this permits an operator to place the tape on the spindle in its desired position and then a positive coupling of the tape to the spindle will be effected.

A further more specific object of the invention is then to provide a new and improved coupling means for a flexible tape which is adapted to be mounted on a reel comprising a fluid pressure mechanism for engaging the end of the material to the reel.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Of the drawings:
FIGURE 1 is an illustrative showing of an apparatus incorporating the principles of the present invention;
FIGURE 2 is a cross-sectional assembly view of a reel and drive hub associated with an apparatus using the principles of the invention;
FIGURES 3A and 3B illustrate a portion of the surface of the spindle of the reel;
FIGURES 4A and 4B illustrate a reel hub used in the apparatus;

FIGURES 5A and 5B show the mechanical form of the driver hub assembly used in the apparatus;

FIGURES 6A and 6B indicate a further seal ring used in the apparatus;

FIGURES 7A, 7B, 7C, 7D and 7E illustrate a stationary seal ring used in the apparatus; and FIGURES 8A and 8B illustrate a retainer for the stationary seal ring.

Referring first to FIGURE 1, there is here illustrated a magnetic tape handling mechanism which is adapted to move a magnetic tape from one reel past a data transfer head to a take-up reel. The tape is adapted to be driven in either direction between either reel and in either direction under the data transfer head associated with the tape.

More specifically, FIGURE 1 illustrates a reel 10 and a further reel 11, both of which are adapted to be mounted and driven in accordance with the principles of the present invention. Wound on the reel 10 is a tape 12 which is arranged to pass from the reel 10 into a first loop chamber 14, the latter providing a certain amount of slack in the tape between the reel 10 and a data transfer mechanism 15. The data transfer mechanism comprises a pair of contra-rotating capstans 16 and 17 and a brake 18, the latter being used to control the movement of tape 12 under a data transfer head 19. This mechanism for driving the tape may be of the type disclosed in a copending application of the present inventor bearing Serial Number 586,209 and filed May 21, 1956, now Patent No. 2,866,637.

On the other side of the data transfer mechanism 15 is a further loop chamber 20 which also provides slack in the tape 12 between the mechanism 15 and the reel 11. The loop chamber 14 has a subatmospheric pressure supplied thereto by way of a pump 21 acting through a port 22, to maintain a subatmospheric pressure below the loop of the tape in the loop chamber. The loop chamber 14 also includes means for sensing the depth of the tape 12 within the chamber and this means may be of any desired type, such as a pneumatic sensing means. For this purpose, a port 23 is positioned near the upper end of the loop chamber 14 while a further port 24 is positioned near the lower end of the loop chamber 14. These two ports are arranged to couple pneumatic pressure signals above and below the tape to a suitable pneumatic switch 25, the latter controlling the operation of a reel drive motor 26. In this apparatus, if the loop of the tape is above the port 23, the pneumatic switch will sense the presence of subatmospheric pressure at both ports 23 and 24 and will be effective to energize the motor 26 to drive the reel 10 in a counter-clockwise direction so that more tape will be fed into the loop chamber 14. If the loop of the tape is below the port 24, the pressure sensing mechanism 25 will have atmospheric pressure at ports 23 and 24 and will be effective to activate the motor 26 so that the reel 10 will be driven in a clockwise direction to take up tape from the loop chamber.

The loop chamber 20 also has an upper port 27 and a lower port 28, the two ports being coupled to supply pressure signals to a further pneumatic switch 29. The switch 29 is in turn connected in driving control relationship to a reel drive motor 30, the latter being adapted to drive the reel 11 in either direction in accordance with the signals supplied thereto by the switch 29. The loop of tape in the loop chamber 20 will have a subatmospheric pressure applied thereto by way of a port 31, the latter being coupled to the pump 21.

The reels 10 and 11 are held in position by pneumatic means supplied with a fluid pressure signal in conduit 35, in a manner to be more fully discussed below. The conduit 35 is coupled to a vacuum source through a solenoid valve 36. The solenoid valve is adapted to be manually controlled by way of a switch 37 and pneumatically controlled by a further pneumatically actuated switch means 38. The pneumatic switch means 38 is coupled to the lower portion of the loop chamber 20 at 39 and at the upper portion at 34.

The pneumatic switch means 38 may also be used as an emergency sensing means to indicate when the tape has moved outside of prescribed limits within the loop chamber 20. Thus, if the tape should pass above the upper port 34, indicating that there is a danger that the tape may be pulled out of the loop chamber, the switch means 38 may be used to interrupt the power supplied to the tape handling portion of the apparatus. Similarly, if the tape loop should pass below the port 39, the switch 38 may also be used to indicate that an emergency condition exists. Once an emergency has been sensed, the switch means 38 may be used to control the operation of a power control relay 33 which may, for example, control all of the electrical power fed to the apparatus. A similar emergency limit system may be incorporated in the loop chamber 14, although it is not shown on the drawing.

It may also be desirable to provide for an interlock which will cut off the power to the apparatus if the vacuum should fail in the conduit 35. For this purpose, a further pneumatic switch means 32 may be provided having an output connected in controlling the relationship to the power control relay 33. The conduit 35 may additionally include a manually operated bleed valve such as the valve MV shown on the drawing.

In considering the operation of the apparatus of FIGURE 1, the operator will first place both of the reels 10 and 11 in position. It is assumed that the reel 10 is the supply reel and that after the particular use of the mechanism has been completed, the tape will be returned to this supply reel 10. In preparing the apparatus for operation, the operator will pay out the tape 12 into the loop chamber 14 and then thread the same through the data transfer means 15. From the data transfer means 15, the tape will be passed through the chamber 20 onto the reel 11. When the tape is in the chamber 20 and forming a loop therein, the pressure below the tape 12 will be subatmospheric and this subatmospheric pressure will be reflected through the port 39 to the switch means 38 to close the associated contacts therein. The operator may then close the manual switch 37 to open the solenoid valve 36. When the solenoid valve 36 is open, the vacuum source will cause a fluid pressure signal to be reflected through the valve 36 and conduit 35 to couple the reels into a firm locking engagement with their associated drive motor. When the reels are firmly coupled to their drive motors and when the data transfer means 15 causes tape movement, the supply reels will function to maintain a desired amount of slack tape in the loop chambers 14 and 20.

In normal operation the tape from the reels will be supplied to the loop chambers at a rate which will always maintain a desired amount of tape in the chambers. However, if there should be an emergency condition whereby there is appreciable slippage in the coupling between the reels and their associated drive motors, there is always a danger that the data transfer means 15 will require tape from a particular loop chamber faster than it is being supplied by the associated reel. Thus, if the data transfer means 15 is moving the tape 12 from left to right and pulling the tape out of the chamber 20, if the reel 11 does not supply tape rapidly enough to the chamber 20, the loop in the chamber may be pulled up past the port 27 and the port 34 and possibly clear out of the chamber. By using the pneumatic switch means 38, as an emergency sensing apparatus, it is possible to remove power from the data transfer means 15. This will be effected by way of the power control relay 33 which will cut off the power to all of the apparatus.

When the tape handling problem has been completed, the tape will normally be moved so that it will be wound up on the reel 10. As that end of the tape which is on reel 11 is approached, it may be desirable to provide a means for sensing the fact that the end is about to be reached. This may be accomplished by perforating the tape so as to remove the differential pressure acting on the tape in the chamber 20. The removal of this differential pressure will be sensed by pneumatic switch means 38 to open its associated contacts and de-energize the solenoid valve 36. The operator may then wind the remaining portion of the tape back onto the reel 10. Once the tape has been moved back onto the reel 10, the pressure acting in the conduit 35 will have been released, as discussed below, so that the reel 10 may be removed from its operative position.

The manner in which the reel is constructed and the manner in which its associated drive hub is constructed will be understood by a more detailed consideration of FIGURES 2 through 8.

Referring to FIGURE 2, there is here shown in cross-sectional detail the tape supply reel as well as the drive shaft and drive hub therefor. In this figure, the reel 10 is illustrated as being formed of a single piece. The reel 10 will be seen to comprise a spindle portion 40 and a pair of side plates 41 and 42. The tape handled by the apparatus will normally be wound upon the spindle and the side plates 41 and 42 will function as guide members for the tape as it is being passed from or fed onto the reel. Within the spindle portion 40 is a cup shaped cylindrical portion into which a suitable drive hub assembly 43 is adapted to fit. Also within the spindle 40 is a further hollow cup shaped portion 44 which is enclosed by the reel wall 45 and the drive hub assembly. Communicating with the space 44, by way of a port 46, are a series of grooves 47 cut in the outer peripheral surface of the spindle 40. These grooves are illustrated in greater detail in FIGURES 3A and 3B. The groove 47, as viewed in FIGURE 3B, will comprise an angular depression in the face of the spindle. As shown in FIGURE 3A, the grooves are cut in the form of a rectangular figure 8. It will be apparent that other forms for the grooves will be equally effective. The fluid pressure signal within the space 44, when coupled through the port 46 to the grooves 47 will provide a pressure signal for holding the end of the tape in position on the spindle when it is placed there by the operator.

Referring back to FIGURE 2, the drive hub 43 will be seen to be formed as a cylindrical member whose outer peripheral surface is adapted to fit within the inner cylindrical portion of the spindle 40. The cross-sectional detail of this reel mounting hub is shown further in FIGURE 4B and in plan view in FIGURE 4A. It will be seen that the outer peripheral surface of this reel hub assembly has a pair of annular grooves 49 cut therein. Further, the face of the hub 43 extends at right angles to the center axis of the hub. The face further has a plurality of grooves 50 cut in the surface thereof. Sealing rings formed of flexible material are adapted to be placed in these grooves in the manner indicated in the assembly detail of FIGURE 2. The outer sealing rings are indicated by the numeral 51 while the face plate sealing rings are indicated by the numeral 52.

Also positioned in the outer peripheral surface of the hub 43 are a plurality of non-metallic members 54. While these members are recessed within the surface of the hub, they project a slight amount outside the surface of the hub to function as a means to prevent any metallic engagement between the inner portion of the reel 10 and the outer portion of the hub 43. These members 54 may well be formed of nylon or other suitable plastic-like material. These non-metallic members 54, by preventing metallic engagement between the reel 10 and the hub 43, serve to prevent any scoring of the related parts either in mounting the reels, removing the reels, or in the event there should be slippage caused by an emergency condition.

The reel hub assembly 43 additionally has drilled immediately outside of its inner opening a series of recessed holes 55 which are adapted to serve as openings through which fastening screws may be passed to engage correspondingly matched tapped holes 58 in the reel driver hub assembly 59 shown in FIGURES 5A and 5B as well as in FIGURE 2. As viewed in FIGURE 5B, the reel driver hub assembly will be seen to comprise a circular plate having a cylindrical extension thereon at 60, said extension having an annular groove 61 cut in the surface thereof for purposes of carrying an appropriate resilient sealing ring 63 shown in FIGURE 2. The hub assembly 59 is drilled through the center with the sides of the hole being tapered in order to provide a matching taper surface for the taper on a drive shaft 65 shown in FIGURE 2. When in position on the drive shaft, the hub assembly 59 is adapted to be locked there by means of a lock nut 66 suitably threadedly engaging the end of the shaft 65. The lock nut 66 may in addition incorporate lock washers thereunder. The hub assembly 59 additionally has a pair of ports drilled therein as at 67 to provide a fluid pressure communicating passage through the hub.

The hub assembly 59 additionally includes an annular ring cut in the side opposite the cylindrical portion 60 into which a seal ring 68 is adapted to be positioned. The seal ring is shown in detail in FIGURES 6A and 6B. The seal ring is drilled so that it will match the ports 67 in the hub assembly 59. In the course of the assembly of the apparatus, the seal ring will normally be mounted and sealed in position by a suitable sealing compound or cement with the ring being oriented in its position on the hub assembly by a dowel adapted to be inserted through the hole 69.

A stationary seal ring 70 of cylindrical shape is provided with a flattened front surface which is adapted to engage the seal ring 68. This cylindrical surface has an annular ring cut in the face of the surface so that as the seal ring 68 is rotated with the hub assembly, the ports 67 will also be communicating with this annular ring. The detail of this stationary seal ring 70 is illustrated in FIGURES 7A–7E. The reverse side of the seal ring will be seen to have four radial slots cut therein, said slots being adapted to co-operate with the arms of the retainer 78, shown in detail in FIGURE 8A. As shown in FIGURE 7E, the seal ring has been drilled and tapped at 72 to provide a fluid pressure communication port through the seal ring 70. This port 72 will be communicating with the annular groove cut in the forward face of this seal ring.

The rear surface of the stationary seal ring 70 additionally has holes drilled therein as at 74 into which compression springs 76 may be placed so as to bias the seal ring firmly against the seal ring 68. The springs co-operate with the retainer 78, shown in FIGURE 2 and FIGURE 8A. It will be seen that this retainer 78 also has a series of holes 79 drilled in the front face thereof which are adapted to co-operate with the springs, such as the spring 76, which force the stationary seal ring 70 into position. In addition, this seal ring retainer 78 has the outer edges on the extensions drilled and counter-bored for purposes of providing a passage for a fastening screw, such as the screw 81 shown in FIGURE 2.

Considering now the over-all assembly, and the manner in which the assembly functions, it will be noted that the fluid pressure source is connected by way of the conduit 35 to the stationary seal ring 70. The conduit communicates through the opening 72 and the seal ring 68 with the ports 67 passing through the reel driver hub assembly 59. Thus, when a subatmospheric pressure is communicated through the ports 67 to the enclosure 44, atmospheric pressure will be acting on the opposite side of the wall portion 45 to force the reel toward the right, as viewed in FIGURE 2, against the hub 43. The differential pressure acting on the wall 45 will thus force the reel into firm engagement with the sealing rings 52 mounted in the annular grooves in the face of the hub 43. In addition, the fluid pressure within the space 44 will be communicated by way of the port 46 to the grooves 47 cut in the peripheral surface of the spindle 40. The fluid pressure communicated thereto will be effective, when the operator places a tape over these grooves, to lock the tape in position on that portion which is immediately adjacent the grooves. This will further serve to seal the pressure within the space 44.

In the present reel mounting apparatus, if the reel is not firmly placed by the operator in the position in which it is shown in the drawing, there will be sufficient leakage of air in the system that the pressure in the conduit 35 will not drop appreciably. Thus, the pneumatic switch means 32 will not indicate that an adequate vacuum exists in the line and it will be impossible to start the apparatus since the power control relay 33 can not be energized. Further, if there should be a mechanical failure within the coupling such that a leak should develop in the vacuum system for the reels, the switch means 32 will be effective to de-energize the relay 33 and cut off the power to the system. It will be apparent that by providing a pneumatic switch which has an adjustable range of operation that the switch means 32 may be rendered effective to cut off the power at a point prior to the actual existance of an emergency.

Once the fluid pressure source is removed from the conduit 35, as by the closing of the valve 36, the subatmospheric pressure within the space 44 will tend to remain there because of the tight manner in which the apparatus is sealed. As soon as the tape on the reel has been unwound to a point where the tape uncovers the grooves 47, air will pass through the port 46 to release the pressure differential on the reel and thereby permit an operator to readily remove the reel from its drive hub. As shown in FIGURE 1, it will be apparent that when the pressure is released in one reel, it will be likewise released in the other for the reason that the conduit is connected to both of the reels.

In the event that it should be desired to remove the reels 10 and 11 at a time before the tape can be removed from the tape locking grooves 47, the vacuum system may be cut-off by opening of the manual switch 37 to cut-off the solenoid valve 36. Further the operator must then bleed the vacuum system by way of the manual valve MV. Once the vacuum has been released, the reels may then be removed.

In the apparatus illustrated, it will be apparent that the co-operative coupling surfaces of the reel and the drive hub are such that they may be coupled in any angular position of the reel with respect to the drive hub. This is highly advantageous for the reason that it is easier to manufacture and consequently much less expensive than a coupling arrangement requiring special orienting means such as guide pins or gear teeth. It has been found that the apparatus as illustrated will operate under conditions of very high driving forces in the coupling without any appreciable slippage. However, if absolute reel orientation is desired, or a firm mechanical connection is required, gear teeth or coupling pins may be formed on the faces of co-operating mating surfaces of the reel and the hub. When such provisions are made, the pneumatic coupling and locking principles of the invention may still be applied to good advantage.

It will be apparent from the foregoing description that there has been provided a new and improved apparatus for mounting a reel and retaining the reel in a rigid driving connection to an associated driving shaft. It will be further apparent that there has been provided a new and improved apparatus for retaining a flexible tape in position on the reel without the requirement of complicated and cumbersome fastening means.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel is:

1. The combination comprising a drive shaft, a reel support and drive hub assembly fastened to said shaft and adapted to rotate therewith, said assembly having a cylindrical mounting section and having a port extending therethrough, a stationary seal surrounding said shaft and having a fluid pressure conduit connected thereto and an opening adapted to communicate with the port in said hub assembly, a reel member adapted to be removably mounted on said hub to be driven by said shaft, said reel member having a fluid pressure tight hollow cylindrical mating surface which is adapted to project over the cylindrical mounting section of said hub assembly so that said reel will be mechanically supported by the hub assembly, and a chamber formed by a surface of said member and a portion of said hub assembly to which a fluid pressure may be applied, said chamber being sealed except at the port through said hub assembly.

2. The combination comprising a drive shaft, a drive hub assembly fastened to said shaft and adapted to rotate therewith, said assembly having a port extending therethrough, a stationary seal surrounding said shaft and having a fluid pressure conduit connected thereto and an opening adapted to communicate with the port in said assembly, a drive motor having a power source connected thereto and being connected in driving relation to said drive shaft, a member to be driven by said shaft, said member having a fluid pressure tight mating surface which is adapted to engage said hub assembly and having a pressure chamber formed by a surface thereof and a portion of said hub assembly to which a fluid pressure may be applied, a fluid pressure supply line connected to said chamber to effect a coupling of said member and said drive hub assembly, and a fluid pressure sensing means connected to said supply line, said last named means being connected in controlling relationship to the power supply for said drive motor to interrupt the supply of power thereto in the event that the pressure in said line exceeds a predetermined value.

3. A supply reel, a support and drive hub for said reel, pneumatic means connected to said hub to act on said hub and on said reel to lock said reel in position on said hub, a powered drive motor connected to said hub, and means connected to said pneumatic means and to a power source for said drive motor to remove power from said drive motor in the event that the pressure in said pneumatic means exceeds a predetermined value.

4. A support hub, a supply reel adapted to be coupled by pneumatic means to said hub to lock said reel in position on said hub, a powered drive motor connected to said hub, and pneumatic pressure sensing means connected to said pneumatic means to remove power from said drive motor in the event that the pressure in said pneumatic means exceeds a predetermined value.

5. In combination, a supply reel which is adapted to be removably mounted and having a hollow cylindrical opening formed therein and a flat walled portion on one side thereof, a support and drive hub for removably receiving said reel, said hub having a cylindrical projection adapted to be positioned within said hollow cylindrical opening and a flat walled section adapted to engage said flat walled portion of said reel, a sealing ring mounted on the peripheral surface of said cylindrical projection to form a fluid-tight seal between said reel and said hub when said reel is in a mounted position, resilient means having a high coefficient of friction positioned between said flat walled portion and said flat walled section and forming a fluid-tight seal, and a fluid connection through said hub to communicate a locking fluid pressure between said reel and said hub.

6. The combination as defined in claim 5 wherein said resilient means comprises a plurality of cylindrical rings partially recessed within said flat-walled section.

7. In combination, a reel support hub having a drive shaft connected thereto, said hub having a reel support section comprising a cylindrical member with an axis common to that of the drive shaft connected thereto and a clutching surface comprising a planar surface extending at right angles to the axis of the drive shaft, a reel adapted to be removably mounted with respect to said support hub, said reel having a hollow cylindrical portion adapted to mate mechanically and supportingly with the cylindrical member of said support hub when positioned over the cylindrical member of said hub and a planar surface extending at right angles to said drive axis and adapted to be engaged by said planar surface of said hub, a resilient sealing member partially recessed in the face of said planar surface of said hub and adapted to extend into engagement with the planar surface of said reel to form a fluid-tight space, and means for coupling a vacuum to said space when said reel has been mounted on said hub so that a driving connection between said reel and hub may be effected by way of the sealing member at said planar surfaces.

8. In combination, a rotatable shaft, a reel mounting and drive hub attached to said shaft, said hub comprising a cylindrical member and a planar end surface which is at right angles to the axis of said shaft, a reel adapted to be removably mounted with respect to said hub and having a hollow cylindrical portion and a planar end surface at right angles to the axis of said reel and adapted to be juxtapositioned with respect to the planar surface on said hub, so that when placed on said hub, said cylindrical portion of said hub will provide a mechanical support for said reel, a vacuum source connected to supply a vacuum to said reel to force said planar end surfaces into engagement with each other and thereby provide a mechanical driving connection between said planar end surfaces, and a flexible sealing member recessed and fixedly mounted in the planar end surface of said hub and positioned between said planar end surfaces to define an acting space for said vacuum and to limit the effect of said vacuum to said planar end surfaces enclosed by said sealing member.

9. In combination, a rotatable shaft, a reel mounting and drive hub attached to said shaft, said hub comprising a metallic cylindrical member and a planar end surface which is at right angles to the axis of said shaft, a reel adapted to be removably mounted with respect to said hub and having a hollow metallic cylindrical portion and a planar end surface at right angles to the axis of said reel and adapted to be juxtapositioned with respect to the planar surface on said hub so that when said reel is placed on said hub, said cylindrical portion of said reel will surround said cylindrical member of said hub and provide a mechanical support for said reel, a vacuum source connected to supply a control vacuum to the hollow portion of said reel to force said planar end surfaces into engagement with each other to provide thereby a mechanical driving connection between said hub and said reel, and a plurality of non-metallic spacer and centering members positioned between the peripheral cylindrical member of said hub and the cylindrical portion of said reel.

References Cited in the file of this patent

UNITED STATES PATENTS

| | | |
|---|---|---|
| 1,961,376 | McIlvried | June 5, 1934 |
| 2,043,239 | Curtis | June 9, 1936 |
| 2,318,056 | Christman | May 4, 1943 |
| 2,338,693 | Dolan | Jan. 4, 1944 |
| 2,746,692 | Wijchman | May 22, 1956 |
| 2,792,217 | Weidenhammer | May 14, 1957 |

FOREIGN PATENTS

| | | |
|---|---|---|
| 626,773 | Great Britain | July 21, 1949 |
| 18,022A | Great Britain | of 1905 |